(12) United States Patent
Yamagajo et al.

(10) Patent No.: US 8,352,233 B2
(45) Date of Patent: Jan. 8, 2013

(54) ELECTROMAGNETIC FIELD SIMULATION APPARATUS

(75) Inventors: Takashi Yamagajo, Kawasaki (JP); Hitoshi Yokemura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 381 days.

(21) Appl. No.: 12/787,610

(22) Filed: May 26, 2010

(65) Prior Publication Data

US 2010/0312539 A1   Dec. 9, 2010

(30) Foreign Application Priority Data

Jun. 5, 2009 (JP) ................................. 2009-136677

(51) Int. Cl.
*G06F 17/50* (2006.01)

(52) U.S. Cl. ......................................................... 703/14

(58) Field of Classification Search ..................... 703/14
See application file for complete search history.

(56) References Cited

U.S. PATENT DOCUMENTS

| | | | |
|---|---|---|---|
| 7,088,088 B1 * | 8/2006 | Marzalek et al. | 324/76.19 |
| 7,498,564 B2 * | 3/2009 | Miles et al. | 250/234 |
| 7,707,020 B2 * | 4/2010 | Sagesaka | 703/14 |
| 8,078,446 B2 * | 12/2011 | Stevens et al. | 703/14 |
| 2005/0251353 A1 * | 11/2005 | Azary | 702/79 |

FOREIGN PATENT DOCUMENTS

| JP | 2001-318961 | 11/2001 |
|---|---|---|
| JP | 2002-19547 | 1/2002 |

OTHER PUBLICATIONS

Sui et al, "Extending the Two-Dimensional FDTD Method to Hybrid Electromagnetic Systems with Active and Passive Lumped Elements", IEEE Transactions on Microwave Theory and Techniques, vol. 40, No. 4, Apr. 1992.*

Shen et al, "Time-Domain Planar Near-Field Measurement Simulation for Wideband RCS Antenna", IEEE Antennas and Propagation Magazine, 2007.*

* cited by examiner

*Primary Examiner* — Mary C Jacob
(74) *Attorney, Agent, or Firm* — Katten Muchin Rosenman LLP

(57) ABSTRACT

An electromagnetic field simulation apparatus disclosed herein replaces a predetermined region in printed circuit board CAD data to be subjected to electromagnetic field simulation with measurement data measured by a near-field measurement device and generates new printed circuit board CAD data. Subsequently, regarding a measurement data portion in the new printed circuit board CAD data generated by the data generating unit, the electromagnetic field simulation apparatus generates analysis model data by setting, as a wave source, an electric field or a magnetic field measured by the near-field measurement device. Then, the electromagnetic field simulation apparatus executes electromagnetic field simulation with respect to the analysis model data having a set wave source.

6 Claims, 10 Drawing Sheets

ELECTROMAGNETIC FIELD SIMULATION APPARATUS

CROSS-REFERENCE TO RELATED APPLICATION(S)

This application is based upon and claims the benefit of priority of the prior Japanese Patent Application No. 2009-136677, filed on Jun. 5, 2009, the entire contents of which are incorporated herein by reference.

FIELD

The embodiments discussed herein are directed to an electromagnetic field simulation apparatus and a near-field measurement device.

BACKGROUND

Typically, in order to analyze the performance of an electronic device or an antenna, an electromagnetic field simulator is used that employs a finite-difference time-domain (FDTD) method to perform electromagnetic field computation intended for communication waves.

The FDTD method is a numerical electromagnetic analysis method expanded to be applicable for cases including the case of time variation in a finite-difference beam-propagation method (FD-BPM). Moreover, the FDTD method is an analysis method that includes differentiation of Maxwell's equations (Faraday's law of induction and Ampere's law), arrangement on a mesh known as a Yee grid, alternate calculation of magnetic and electric fields in time and space, and determination of the electric and magnetic fields.

In recent years, there has been an active implementation of near-field measurement devices for the purpose of electromagnetic compatibility (EMC) provision or antenna radiation pattern measurement in electronic devices. As illustrated in FIG. 13, a near-field measurement device is a measurement device including system software (in a personal computer: PC), a spectrum analyzer, and a measuring instrument. Thus, FIG. 13 is a schematic diagram of a configuration of a near-field measurement device.

The measuring instrument obtains, with a magnetic field probe, the magnetic field (voltage) generated by the supply of an electrical current to a substrate (equipment under test: EUT) and outputs the obtained magnetic field to the spectrum analyzer. Then, the spectrum analyzer displays, on a screen, the data received from the measuring instrument in the form of a two-dimensional graph having frequency as the horizontal axis and electric power of voltage as the vertical axis. The PC is able to control the position of the magnetic field probe with the use of measuring software, to obtain the magnetic field strength distribution on the basis of the information displayed by the spectrum analyzer or the information obtained by the measuring instrument, and to identify a noise source in a frequency range by performing detail analysis.

Recently, there has been disclosure of a near-field measurement device, as illustrated in FIG. 14, that is able to perform amplitude and phase measurement with the use of an optical magnetic field probe and a network analyzer. Thus, FIG. 14 is a schematic diagram of a configuration of a near-field measurement device that is able to perform amplitude and phase measurement.

Such measurement devices are disclosed in for example Japanese Laid-open Patent Publication Nos. 2001-318961 and No. 2002-19547.

Meanwhile, with the recent advances in computing devices, there is a need to enable analysis of electronic devices in their entirety. For that purpose, it is necessary to perform accurate modeling of electronic devices in the order of tens of μm. However, in the case of implementing the conventional technology as mentioned above, an increase in the number of discretized components leads to an enormous expansion of the analysis scale. Hence, the analysis becomes computationally expensive.

SUMMARY

According to an aspect of an embodiment of the invention, an electromagnetic field simulation apparatus includes a data generating unit that, by replacing a predetermined region in printed circuit board CAD data to be subjected to an electromagnetic field simulation with measurement data measured by a near-field measurement device, generates new printed circuit board CAD data; a wave source setting unit that, regarding a measurement data portion in the new printed circuit board CAD data generated by the data generating unit, generates analysis model data by setting, as a wave source, an electric field or a magnetic field measured by the near-field measurement device; and a simulation executing unit that executes the electromagnetic field simulation with respect to the analysis model data having a wave source set by the wave source setting unit.

According to another aspect of an embodiment of the invention, a near-field measurement device includes a measuring unit that, at time of measuring an electric field or a magnetic field generated in an equipment under test by supplying an electric current to the equipment under test, performs control so that a position of a probe for obtaining the electric field or the magnetic field corresponds to a position of a Yee cell in a FDTD method and measures the electric field or the magnetic field generated in the equipment under test.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Figure 1:
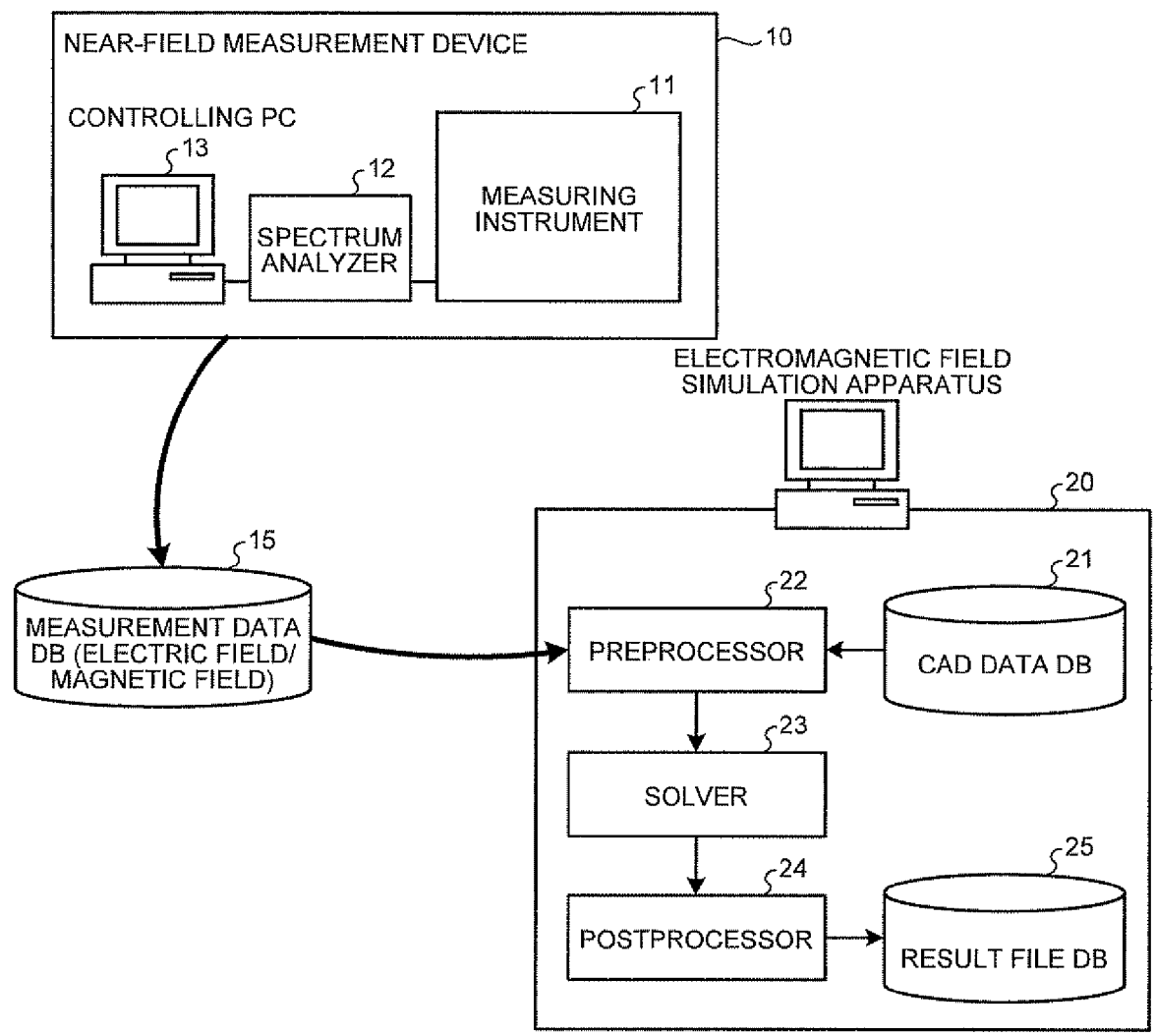
FIG. 1 is a block diagram of a configuration of an electromagnetic field simulation apparatus according to a first embodiment.

Preferred embodiments of the present invention will be explained with reference to accompanying drawings. The present invention is not limited to that embodiment.

An electromagnetic field simulation apparatus disclosed herein can perform time-domain simulation for finding sequential changes in the magnetic field by carrying out, for example, three-dimensional electromagnetic field simulation (three-dimensional electromagnetic field analysis) using the FDTD method with respect to printed circuit board computer-aided design (CAD) data. Specifically, the electromagnetic field simulation apparatus disclosed herein enables achieving prevention in the expansion of the analysis scale of electromagnetic field simulation and thus enables achieving reduction in the computational cost of electromagnetic field simulation.

More particularly, by replacing a predetermined region in the printed circuit board CAD data to be subjected to electromagnetic field simulation with measurement data that is measured by a near-field measurement device, the electromagnetic field simulation apparatus generates new printed circuit board CAD data. For example, the electromagnetic field simulation apparatus stores, in a database, the printed circuit board CAD data input by a user and reads the data specified by the user from the database. Then, the electromagnetic field simulation apparatus receives, from the user, specification regarding a region in the printed circuit board CAD data, which is obtained by reading, for inserting measurement data that is measured by a near-field measurement device. Subsequently, the electromagnetic field simulation apparatus obtains the measurement data corresponding to the specified region and generates new printed circuit board CAD data by replacing the specified region in the existing printed circuit board CAD data with the corresponding measurement data. Meanwhile, in order to specify a region, the user can make use of a graphical user interface (GUI) displayed on a screen of the electromagnetic field simulation apparatus.

Regarding the measurement data portion in the newly-generated printed circuit board CAD data, the electromagnetic field simulation apparatus generates analysis model data in which the electric field or the magnetic field measured by the near-field measurement device is set as a wave source. For example, the electromagnetic field simulation apparatus performs inverse fast Fourier transform (IFFT) with respect to electromagnetic near-field measurement data present in the specified region in the newly-generated printed circuit board CAD data and converts the measurement data from frequency domain into time domain. Subsequently, regarding the measurement data portion in the newly-generated printed circuit board CAD data, the electromagnetic field simulation apparatus sets, as the wave source, the electric field or the magnetic field measured by the near-field measurement device. Herein, the wave source represents a voltage source or a current source for applying electrical current to circuits and propagates electromagnetic waves. Meanwhile, regarding the portion other than the measurement data portion in the newly-generated printed circuit board CAD data; the electromagnetic field simulation apparatus receives, in a conventional manner, settings for material properties/circuit components/wave source from the user and enables those settings. In this way, the electromagnetic field simulation apparatus generates the analysis model data.

Then, the electromagnetic field simulation apparatus performs electromagnetic field simulation with respect to the analysis model data having a set wave source. For example, with respect to the analysis model data that includes the measured data having the measured electric field or the measured magnetic field set as the wave source and the CAD data set with the information received from the user in a conventional manner, the electromagnetic field simulation apparatus performs electromagnetic field simulation using the FDTD method.

In this way, at the time of generating the model data to be subjected to electromagnetic field simulation, the electromagnetic field simulation apparatus disclosed herein can use, in part, the data measured by the near-field measurement device. That eliminates the need of setting material properties/circuit components/wave source with respect to all of the model data of an enormous volume. Moreover, by partially using the measurement data in the model data, the model gets simplified thereby enabling efficient analysis. Therefore, the electromagnetic field simulation apparatus disclosed herein enables achieving prevention in the expansion of the analysis scale of electromagnetic field simulation and thus enables achieving reduction in the computational cost of electromagnetic field simulation.

First Embodiment

Configuration of electromagnetic field simulation apparatus

Explained below is a configuration of an electromagnetic field simulation apparatus. FIG. 1 is a block diagram of a configuration of an electromagnetic field simulation apparatus according to a first embodiment of the present invention.

As illustrated in FIG. 1, an electromagnetic field simulation apparatus 20 according to the first embodiment includes a CAD data database (DB) 21, a preprocessor 22, a solver 23, a postprocessor 24, and a result file DB 25. Besides, the electromagnetic field simulation apparatus 20 is connected to a near-field measurement device 10 or a measurement data DB 15. Meanwhile, the near-field measurement device 10 or the measurement data DB 15 can be installed inside the electromagnetic field simulation apparatus 20 or can be disposed outside as illustrated in FIG. 1.

Firstly, the explanation is given about the near-field measurement device 10 that is connected to the electromagnetic field simulation apparatus 20. As illustrated in FIG. 1, the near-field measurement device 10 includes a measuring instrument 11, a spectrum analyzer 12, a controlling PC 13, and the measurement data DB 15.

The measuring instrument 11 obtains, with a magnetic field probe, the magnetic field (voltage) generated by the supply of an electrical current to a substrate (EUT) and outputs the obtained magnetic field to the spectrum analyzer 12. Then, the spectrum analyzer 12 displays, on a screen, the data received from the measuring instrument 11 in the form of a two-dimensional graph having frequency as the horizontal axis and electric power of voltage as the vertical axis.

The controlling PC 13 is able to control the position of the magnetic field probe with the use of measuring software, to obtain a magnetic field strength distribution on the basis of the information displayed by the spectrum analyzer 12 or the information obtained by the measuring instrument 11, and to identify a noise source or a magnetic field strength distribution in a frequency range by performing detail analysis. Moreover, the controlling PC 13 stores, in the measurement data DB 15, the data measured by the measuring instrument 11 or the abovementioned information.

More particularly, the measurement data DB 15 is used to store measurement data that is arranged in a grid-like arrangement and that includes amplitudes or phases of the magnetic and electric fields measured by the measuring instrument 11. Besides, the measurement data DB 15 is used to store the noise source or the magnetic field strength distribution analyzed by the controlling PC 13. Thus, the measurement data DB 15 is used to store the measured data measured for each EUT in a corresponding manner with the EUT.

Described below is the configuration of the electromagnetic field simulation apparatus 20. As illustrated in FIG. 1, the electromagnetic field simulation apparatus 20 includes the CAD data DB 21, the preprocessor 22, the solver 23, the postprocessor 24, and the result file DB 25.

The CAD data DB 21 is used to store printed circuit board CAD data generated by the user with the use of a CAD tool. The data stored in the CAD data DB 21 is, for example, not completely three-dimensional data but is 2.5-dimensional CAD data for a simplified solid display of an object on a CAD screen by only adding height information to a planar map or by representing a plurality of layers.

Figure 2:
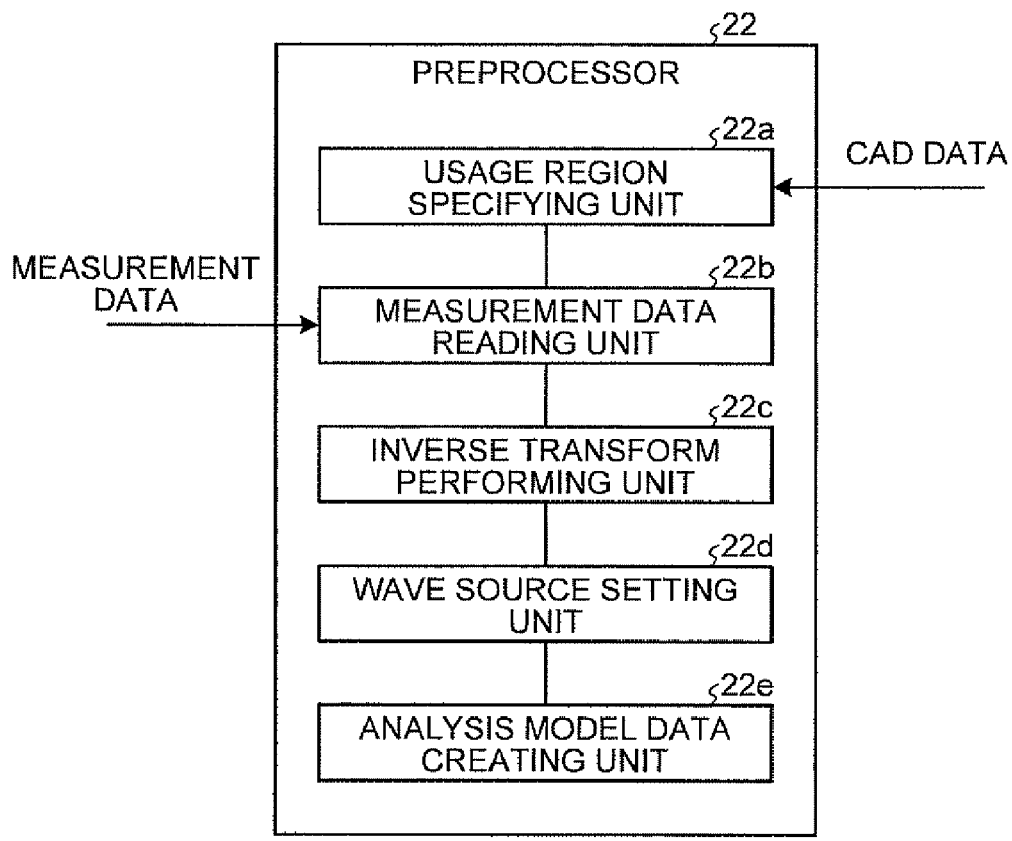
FIG. 2 is a schematic diagram of a configuration of a preprocessor.

The preprocessor 22 creates, on the basis of the data stored in the CAD data DB 21 and the measurement data stored in the measurement data DB 15, an analysis model that is to be subjected to electromagnetic field simulation. More particularly, as illustrated in FIG. 2, the preprocessor 22 includes a usage region specifying unit 22a, a measurement data reading unit 22b, an inverse transform performing unit 22c, a wave source setting unit 22d, and an analysis model data creating unit 22e that are used in creating the analysis model. Thus, FIG. 2 is a schematic diagram of a configuration of the preprocessor 22.

The usage region specifying unit 22a reads, from the CAD data DB 21, the printed circuit board CAD data corresponding to a user-specified EUT. Then, the usage region specifying unit 22a receives, from the user, specification regarding a region in the printed circuit board CAD data, which is obtained by reading, for inserting the measurement data that is measured by the near-field measurement device 10. Moreover, to the measurement data reading unit 22b, the usage region specifying unit 22a outputs the printed circuit board CAD data obtained by reading and the information on the EUT and region specified by the user.

Alternatively, the usage region specifying unit 22a can be configured to execute a predetermined transformation tool on the printed circuit board CAD data obtained by reading, extract data such as a signal layer or a power source/GND layer, and output the extracted data as model data to the measurement data reading unit 22b. Meanwhile, the usage region specifying unit 22a displays a GUI that enables specification regarding a target EUT for analysis or a region and then receives user specification from the GUI.

The measurement data reading unit 22b generates new printed circuit board CAD data by replacing a predetermined region in the printed circuit board CAD data to be subjected to electromagnetic field simulation with the measurement data measured by the near-field measurement device 10. More particularly, the measurement data reading unit 22b obtains, from the measurement data DB 15, the measurement data of the EUT received from the usage region specifying unit 22a, that is, the measurement data of the region received from the usage region specifying unit 22a. Then, the measurement data reading unit 22b generates new printed circuit board CAD data by replacing the specified region on the printed circuit board CAD data (model data) received from the usage region specifying unit 22a with the measurement data obtained from the measurement data DB 15.

For example, assume that in the printed circuit board CAD data corresponding to an EUT (A) that is received by the measurement data reading unit 22b from the usage region specifying unit 22a, a specified region A ranges from (x1, y1, z1) to (x2, y2, z2). In that case, the measurement data reading unit 22b reads the measurement data of the EUT (A) from the measurement data DB 15 and extracts a region B ranging from (x1, y1, z1) to (x2, y2, z2) from the measurement data. Then, the measurement data reading unit 22b generates new printed circuit board CAD data by replacing the region A in the printed circuit board CAD data corresponding to the EUT (A) with the region B extracted from the measurement data of the EUT (A). Herein, although the explanation is given for the case of replacing a region specified by coordinates, the definition of a region is not limited to the same. For example, in the case of multilayer CAD data, a layer such as the second layer can be specified as a region.

The inverse transform performing unit 22c performs IFFT with respect to the printed circuit board CAD data that is newly-generated by the measurement data reading unit 22b and converts the replaced measurement data from frequency domain into time domain (time waveform). Then, the inverse transform performing unit 22c outputs, to the wave source setting unit 22d, the newly-generated printed circuit board CAD data that includes the converted measurement data.

Regarding the measurement data portion in the printed circuit board CAD data that is newly-generated by the inverse transform performing unit 22c, the wave source setting unit 22d sets, as the wave source, the electric field or the magnetic field measured by the near-field measurement device 10. More particularly, the wave source setting unit 22d is a processing unit for setting the wave source with respect to the newly-generated printed circuit board CAD data that is received from the inverse transform performing unit 22c. For example, the wave source setting unit 22d performs settings for material properties, settings for circuit components or wave source, and settings for output items.

Figure 3:
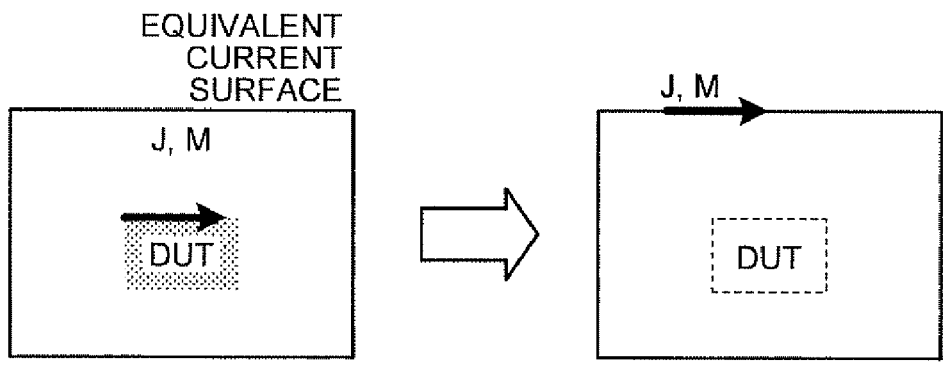
FIG. 3 is an explanatory diagram for explaining a method of setting an equivalent current using the surface equivalence theorem.

With respect to the printed circuit board CAD data that is newly-generated by the inverse transform performing unit 22c, the wave source setting unit 22d can set the wave source by various methods. For example, as illustrated in FIG. 3, the near-field measurement device 10 performs amplitude and phase measurement for the electromagnetic field on a closed surface enclosing an EUT instead of the EUT itself and then sets an equivalent current on the surface instead of setting a current flowing to the EUT. In that case, the wave source setting unit 22d sets the equivalent current on the FDTD model, that is, sets the equivalent current as the wave source of the measurement data portion in the newly-generated printed circuit board CAD data. Thus, FIG. 3 is an explanatory diagram for explaining a method of setting an equivalent current using the surface equivalence theorem.

Figure 4:
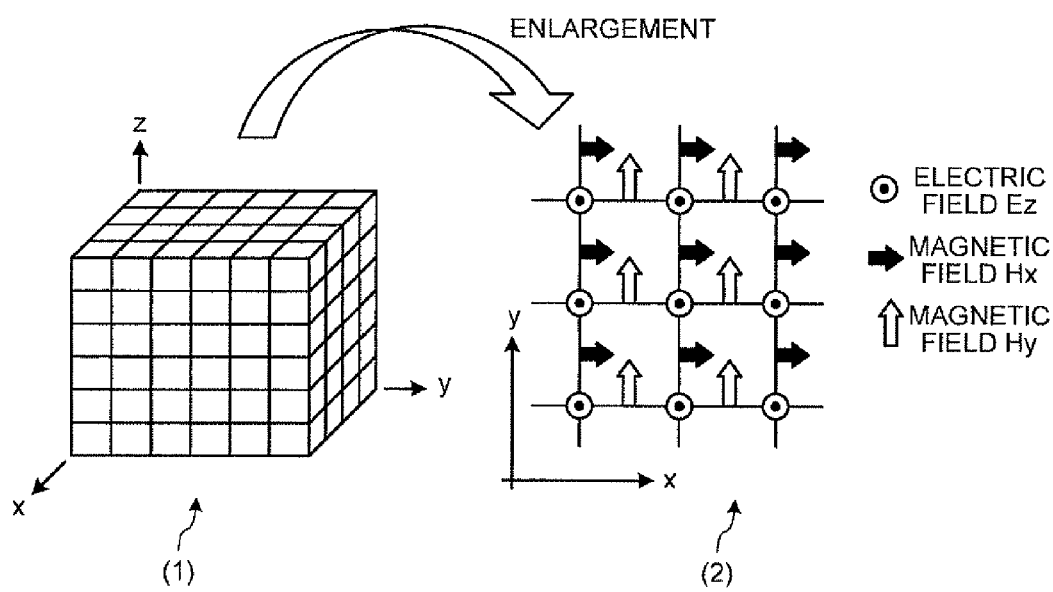
FIG. 4 is a schematic diagram of an example of setting, as a wave source, an electric field or a magnetic field in time domain.
Figure 5:
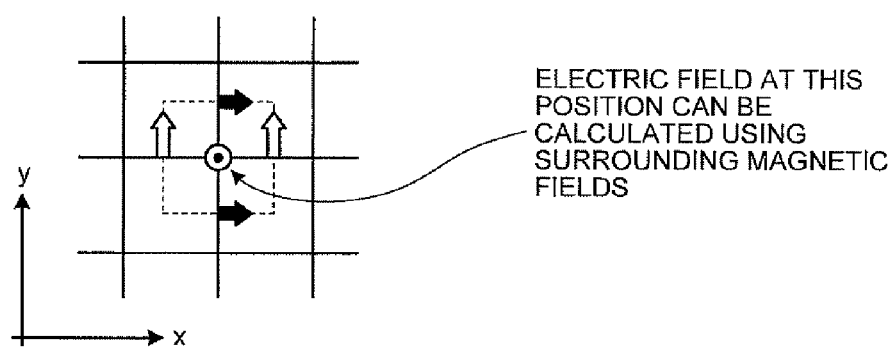
FIG. 5 is an enlarged view for explaining electric field setting.
Figure 6:
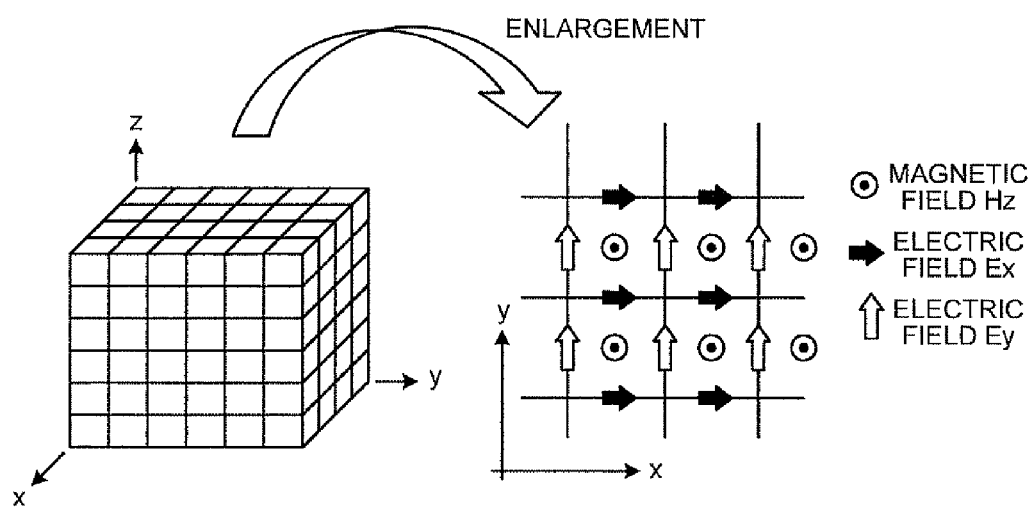
FIG. 6 is a schematic diagram of another example of wave source setting.

Alternatively, for example, the wave source setting unit 22d can be configured to perform IFFT with respect to the measurement result (magnetic field or electric field, amplitude or phase, etc.) measured by the near-field measurement device 10 and set, as the wave source of the measurement data portion, the electric field/magnetic field of each region on the grid. More particularly, assume that the near-field measurement device 10 measures the electric field/magnetic field of the surfaces of a region indicated by (1) in FIG. 4. In that case, as indicated by (2) in FIG. 4, the wave source setting unit 22d can be configured to set, as the wave source of the measurement data portion, an electric field Ez or magnetic fields Hx and Hy in time domain. Meanwhile, the near-field measurement device 10 need not measure the electric field as well as the magnetic fields. Instead, the near-field measurement device 10 can be configured to measure only the magnetic fields Hx and Hy (see FIG. 5). As an alternative configuration, a magnetic field Hz can be set at the center of grids and electric fields Ex and Ey can be respectively set on the x axis and the y axis as illustrated in FIG. 6. Meanwhile, herein, FIG. 4 is a schematic diagram of an example of setting, as the wave source, an electric field or a magnetic field in time domain. FIG. 5 is an enlarged view for explaining electric field setting. FIG. 6 is a schematic diagram of another example of wave source setting.

Still alternatively, for example, the wave source setting unit 22d can be configured to convert a magnetic field H, which is obtained as the measurement result of the measurement performed by the near-field measurement device 10, into an electric current source J or convert an electric field E, which is obtained as the measurement result, into a magnetic current source M, and then set the electric current source J or the magnetic current source M as the wave source of the measurement data portion. In that case, by substituting the magnetic field H or the electric field E in Equation (1) or Equation (2), respectively, the wave source setting unit 22d calculates the electric current source J or the magnetic current source M. In Equations (1) and (2), "n" represents a normal vector corresponding to a magnetic field measuring surface.

$$J = n \times H \quad (1)$$

$$M = -n \times E \quad (2)$$

Figure 7:
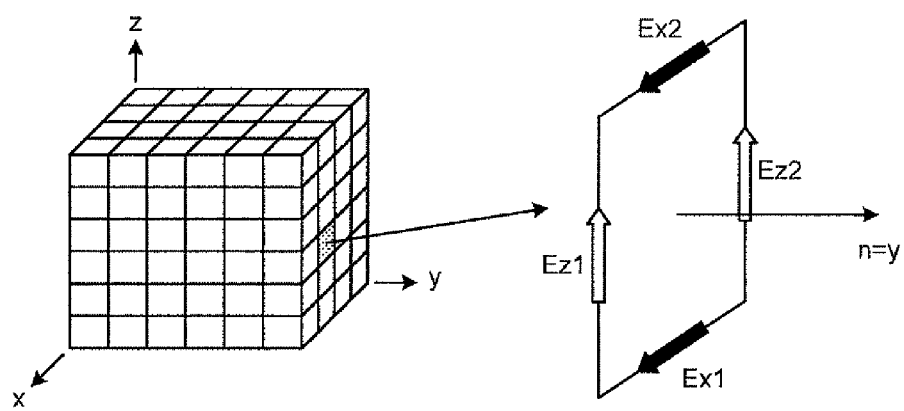
FIG. 7 is a schematic diagram of examples of measured electric fields.

For example, as illustrated in FIG. 7, assume that the near-field measurement device 10 measures, with the y axis as the normal vector, electric fields Ex1 and Ex2 in the x axis and electric fields Ez1 and Ez2 in the z axis of a measuring surface. In that case, the wave source setting unit 22d can substitute "y" for "n" in Equation (2) and replace the electric field E with the measured electric fields Ex1, Ex2, Ez1, and Ez2 so that a conversion equation is obtained as given in Equation (3). Meanwhile, each of x, y, and z in Equation (3) represents a unit vector.

$$\begin{aligned} M &= -n \times E \\ &= -y \times E \\ &= Ex \times z - Ez \times x \\ &= \left(\frac{Ex1 \times Ex2}{2}\right) \times z - \left(\frac{Ez1 + Ez2}{2}\right) \times x \end{aligned} \quad (3)$$

Figure 8:
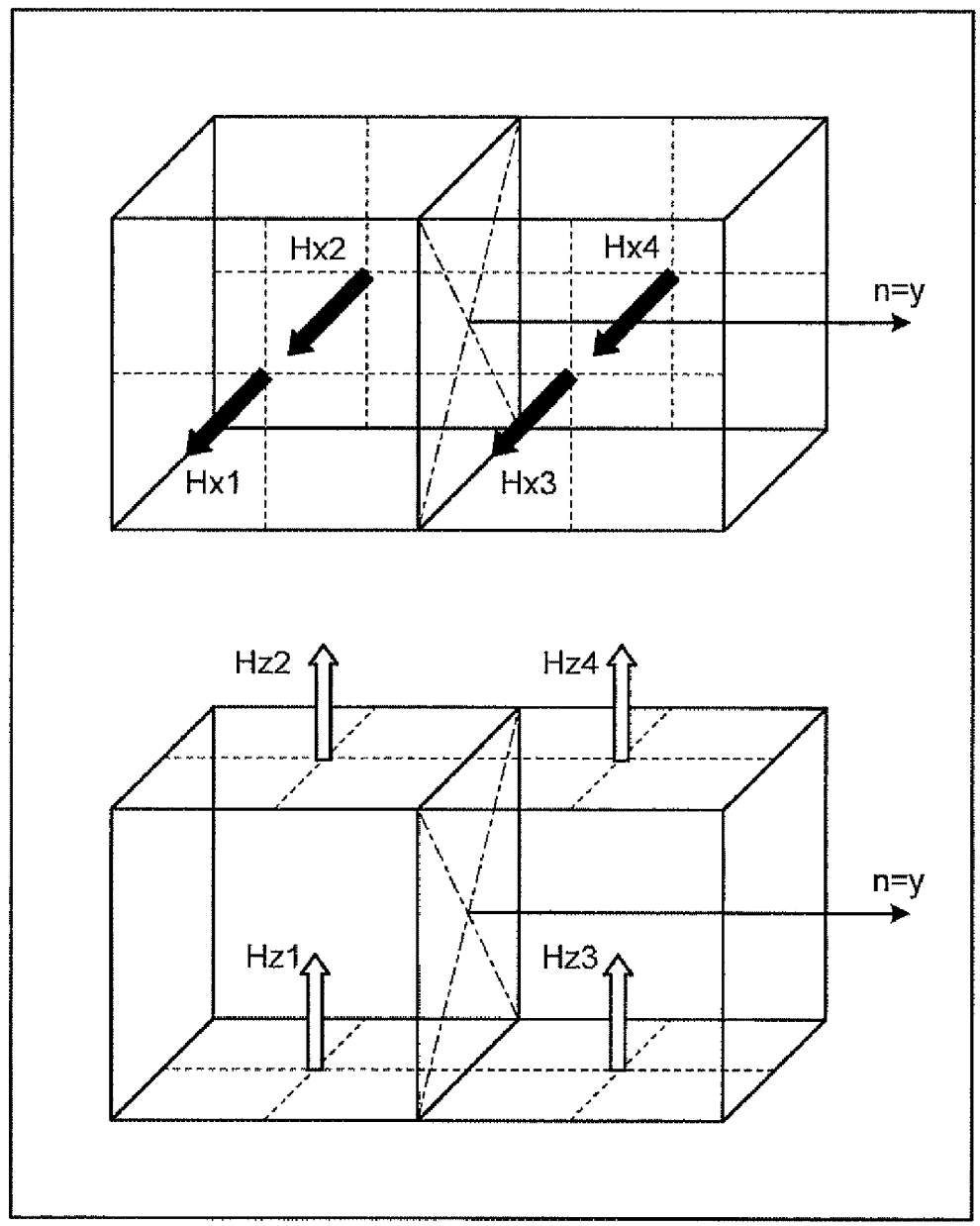
FIG. 8 is a schematic diagram of examples of measured magnetic fields.

Alternatively, as illustrated in FIG. 8, assume that the near-field measurement device 10 measures, with the y axis as the normal vector, magnetic fields Hx1 to Hx4 in the x axis and magnetic fields Hz1 to Hz4 in the z axis of a measuring surface. In that case, the wave source setting unit 22d can substitute "y" for "n" in Equation (1) and replace the electric field H with the measured magnetic fields Hx1 to Hx4 and Hz1 to Hz4 so that a conversion equation is obtained as given in Equation (4). Meanwhile, each of x, y, and z in Equation (4) represents a unit vector.

$$\begin{aligned} J &= n \times H \\ &= y \times H \\ &= -Hx \times z + Hz \times x \\ &= -\left(\frac{Hx1 + Hx2 + Hx3 + Hx4}{4}\right) \times z + \\ &\quad \left(\frac{Hz1 + Hz2 + Hz3 + Hz4}{4}\right) \times x \end{aligned} \quad (4)$$

Then, the wave source setting unit 22d converts the magnetic field H, which is obtained as the measurement result of the measurement performed by the near-field measurement device 10, into the electric current source J using Equation (4) or converts the electric field E, which is obtained as the measurement result, into the magnetic current source M using Equation (3), and then sets the electric current source J or the magnetic current source M as the wave source of the measurement result. Herein, FIG. 7 is a schematic diagram of examples of measured electric fields and FIG. 8 is a schematic diagram of examples of measured magnetic fields.

Meanwhile, regarding the portion other than the measurement data portion in the newly-generated printed circuit board CAD data, the wave source setting unit 22d receives settings for material properties/circuit components/wave source from the user and enables those settings. More particularly, the wave source setting unit 22d receives the settings for material properties such as electric permittivity, electric conductivity, and magnetic permeability from the user; receives the settings for circuit components such as a resistor, a capacitor, an inductor, and a resistor from the user; and enables those settings in the newly-generated printed circuit board CAD data. Moreover, the wave source setting unit 22d enables, upon receiving from the user, settings indicating how much voltage is to be applied at which positions, settings regarding the wave source of a voltage source or a current source used in applying current to the circuits, and output settings indicating what kind of values are to be output as the result of electromagnetic field simulation (electromagnetic field analysis) or indicating where to output those values (e.g., to a control unit connected via a network).

Then, the wave source setting unit 22d sends, to the analysis model data creating unit 22e, new printed circuit board CAD data that includes the measurement data portion set with the electric field or the magnetic field measured by the near-field measurement device 10 and that includes the region enabled with the settings for material properties/circuit components/wave source.

Returning to the explanation with reference to FIG. 2, the analysis model data creating unit 22e converts the new printed circuit board CAD data received from the wave source setting unit 22d into analysis model data to be subjected to electromagnetic field simulation. More particularly, the analysis model data creating unit 22e creates the analysis model data by setting a simulator observation time and performing discretization in the space axis or the time axis with respect to the new printed circuit board CAD data.

For example, in electromagnetic field simulation, the impulse response of an entire model is observed and time variation in an electromagnetic field, which is generated by the supply of an electric current to the model data, is output. Hence, the analysis model data creating unit 22e sets an observation time that indicates the time period for which observation is carried out since the supply of an electric current to the model data. Meanwhile, since the discretization method is implemented using the FDTD method, the details thereof are not given.

Returning to the explanation with reference to FIG. 1, the solver 23 is a program executing unit that performs electromagnetic field simulation and then performs numerical analysis of the information obtained from electromagnetic field simulation. More particularly, the solver 23 performs electromagnetic field simulation with respect to the analysis model data generated by the preprocessor 22, performs numerical analysis using the FDTD method on the result of electromagnetic field simulation, and outputs the analysis result to the postprocessor 24.

The postprocessor 24 follows the output result set by the analysis model data creating unit 22e and calculates a simulation result such as the antenna far-field radiation pattern or the current density distribution. More particularly, the postprocessor 24 follows the output result set by the analysis model data creating unit 22e and calculates the antenna far-field radiation pattern or the current density distribution from the numerical analysis result received from the solver 23. Then, the postprocessor 24 displays the calculated simulation result on a display or stores the simulation result in the result file DB 25.

The result file DB 25 is the database for storing the result of electromagnetic field simulation. For example, the result file DB 25 is used to store the simulation result such as the antenna far-field radiation pattern or the current density distribution in a corresponding manner with each EUT.

Sequence of operations performed by electromagnetic field simulation apparatus

Figure 9:
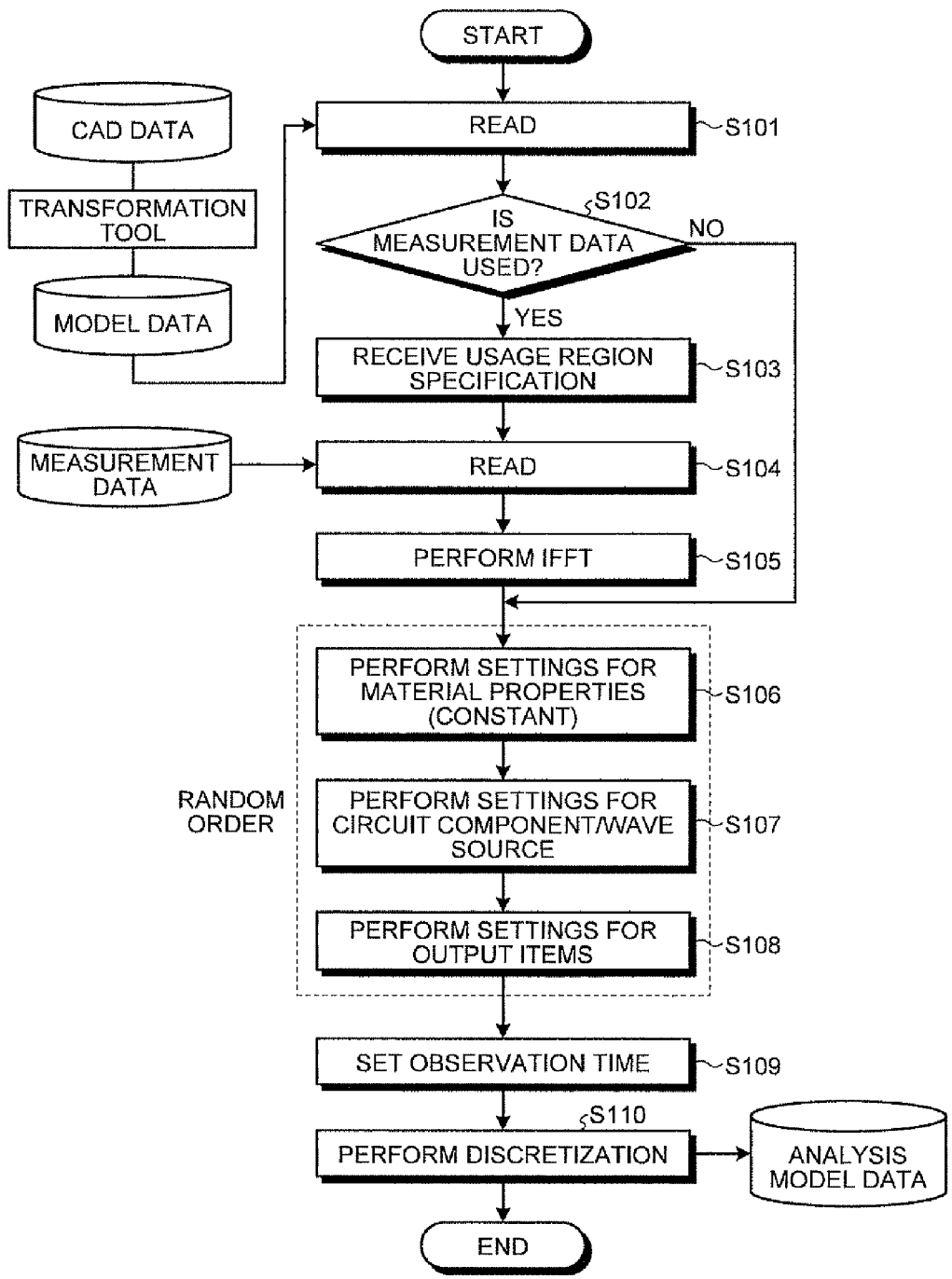
FIG. 9 is a flowchart for explaining the sequence of operations performed by the electromagnetic field simulation apparatus according to the first embodiment.

Explained below with reference to FIG. 9 is the sequence of operations performed by the electromagnetic field simulation apparatus. FIG. 9 is a flowchart for explaining the sequence of operations performed by the electromagnetic field simulation apparatus according to the first embodiment.

As illustrated in FIG. 9, the usage region specifying unit 22a in the electromagnetic field simulation apparatus 20 makes use of a transformation tool and reads, from the printed circuit board CAD data specified by the user, the model data that includes extracted data of a signal layer or a power source/GND layer (Step S101).

If the user has specified to use the measurement data (Yes at Step S102), then the usage region specifying unit 22a receives, from the user, specification regarding a region for inserting the measurement data (Step S103). Then, the measurement data reading unit 22b in the electromagnetic field simulation apparatus 20 reads the measurement data corresponding to the EUT of the model data and generates new printed circuit board CAD data by replacing the specified region in the model data with the measurement data (Step S104).

Subsequently, the inverse transform performing unit 22c in the electromagnetic field simulation apparatus 20 performs inverse fast Fourier transform (IFFT) with respect to the newly-generated printed circuit board CAD data and converts the replaced measurement data from frequency domain into time domain (time waveform) (Step S105).

Then, regarding the portion (CAD data region) other than the measurement data portion in the newly-generated printed circuit board CAD data, the wave source setting unit 22d in the electromagnetic field simulation apparatus 20 receives settings for material properties/circuit components/wave source from the user and enables those settings (Steps S106 to S108). Meanwhile, regarding the measurement data portion in the newly-generated printed circuit board CAD data, the wave source setting unit 22d sets the electric field or the magnetic field measured by the near-field measurement device 10 as the wave source in the abovementioned manner.

Subsequently, the analysis model data creating unit 22e in the electromagnetic field simulation apparatus 20 sets a simulator observation time with respect to the new printed circuit board CAD data (model data) having a set wave source (Step S109). Moreover, the analysis model data creating unit 22e creates analysis model data by performing discretization in the space axis or the time axis with respect to the new printed circuit board CAD data (model data) having a set wave source (Step S110).

Since the electromagnetic field simulation processing performed with respect to the analysis model data is identical to commonly-used electromagnetic field simulation processing, the explanation thereof is omitted.

EFFECT OF FIRST EMBODIMENT

According to the first embodiment, at the time of generating model data to be subjected to electromagnetic field simulation, it is possible to use, in part, the data measured by a near-field measurement device. That eliminates the need of setting material properties/circuit components/wave source with respect to all of the model data of an enormous volume. Moreover, by partially using the measurement data in the model data, the model gets simplified thereby enabling efficient analysis. As a result, the electromagnetic field simulation apparatus disclosed herein enables achieving prevention in the expansion of the analysis scale of electromagnetic field simulation and thus enables achieving reduction in the computational cost of electromagnetic field simulation.

Moreover, according to the first embodiment, since the measurement data can be used, in part, in the model data; even in an electronic device including a component such as a large-scale integration that can be regarded as "black box", it becomes possible to replace the component regarded as "black box" with the model data. As a result, even in an electronic device including a component regarded as "black box", electromagnetic field simulation can be performed in a highly accurate manner.

Meanwhile, apart from the above-mentioned embodiment of the present invention, the present invention can also be implanted using various other embodiments. Herein, other embodiments are explained by dividing the description into (1) efficient measurement, (2) application example, (3) interpolation, (4) system configuration, and (5) computer program.

(1) Efficient Measurement

Figure 10:
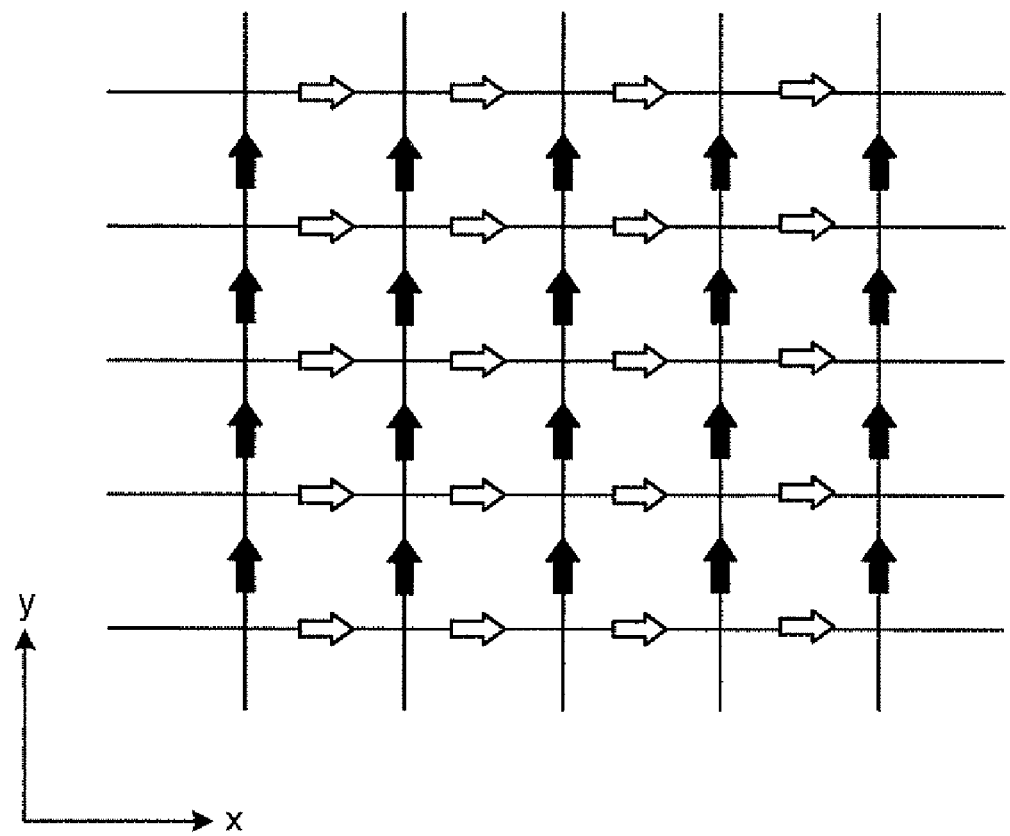
FIG. 10 is a schematic diagram of a positional relation between measurement positions and Yee cells.

For example, by using the measurement data that is measured in such a way that the measurement positions for the electric field or the magnetic field measured by the near-field measurement device 10 correspond to the positions of the Yee cells in the FDTD method, the electromagnetic field simulation apparatus 20 can easily make use of the measured data in simulation. More particularly, as illustrated in FIG. 10, the near-field measurement device 10 measures the electric field or the magnetic field after determining the measurement positions in such a way that Hx is calculated on the x axis and Hy is calculated on the y axis in a cell structure (Yee cells) in the FDTD. Then, the electromagnetic field simulation apparatus 20 can easily make use of such measured data in simulation. FIG. 10 is a schematic diagram of a positional relation between measurement positions and Yee cells.

(2) Application Example

The electromagnetic field simulation apparatus 20 disclosed herein can also be implemented for performing electromagnetic field simulation with respect to a cellular phone.

Figure 11:
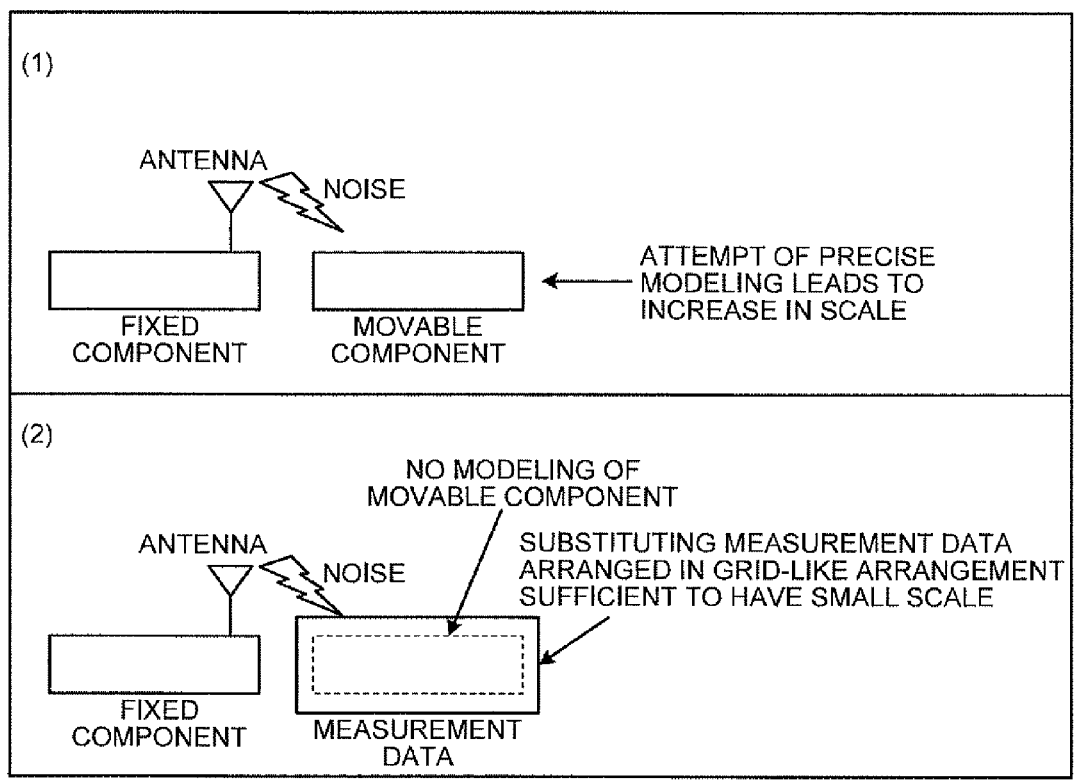
FIG. 11 is a schematic diagram for explaining an example of the application of the electromagnetic field simulation apparatus disclosed herein.

More particularly, as illustrated in case (1) in FIG. 11, in the case of performing electromagnetic field simulation with respect to a cellular phone; attempting precise modeling for the movable component of the cellular phone leads to an increase in the scale thereby causing an increase in the computational cost of electromagnetic field simulation. Thus, as illustrated in case (2) in FIG. 11, by replacing the movable component of the cellular phone with measurement data arranged in a grid-like arrangement as described above; it is sufficient to have only a small model scale so that it becomes possible to reduce the computational cost of electromagnetic field simulation. FIG. 11 is a schematic diagram for explaining an example of the application of the electromagnetic field simulation apparatus 20 disclosed herein.

(3) Interpolation

For example, at the time of creating the analysis model data by discretization, the electromagnetic field simulation apparatus 20 can interpolate the measurement data that is arranged in a grid-like arrangement so that it can be automatically replaced by the electric field on the Yee cells.

(4) System Configuration

Meanwhile, of the processes described in the embodiments, all or part of the processes explained as being performed automatically can be performed manually. Similarly, all or part of the processes explained as being performed manually can be performed automatically by a known method. Besides, the sequence of operations, the sequence of control, the particular naming, and the information including a variety of data or parameters in the abovementioned description or in the drawings can be arbitrarily changed unless otherwise stated.

The constituent elements of the device illustrated in the drawings are merely conceptual, and need not be physically configured as illustrated. The constituent elements, as a whole or in part, can be separated or integrated either functionally or physically based on various types of loads or use conditions. The process functions performed by the device are entirely or partially realized by the CPU or computer programs that are analyzed and executed by the CPU, or realized as hardware by wired logic.

(5) Computer Program

Meanwhile, the operations described in the first embodiment can be implemented by executing, in a computer such as a personal computer or a workstation, a program written in advance. Given below is the description of an exemplary computer program that executes a program having identical functions to those described in the first embodiment.

Figure 12:
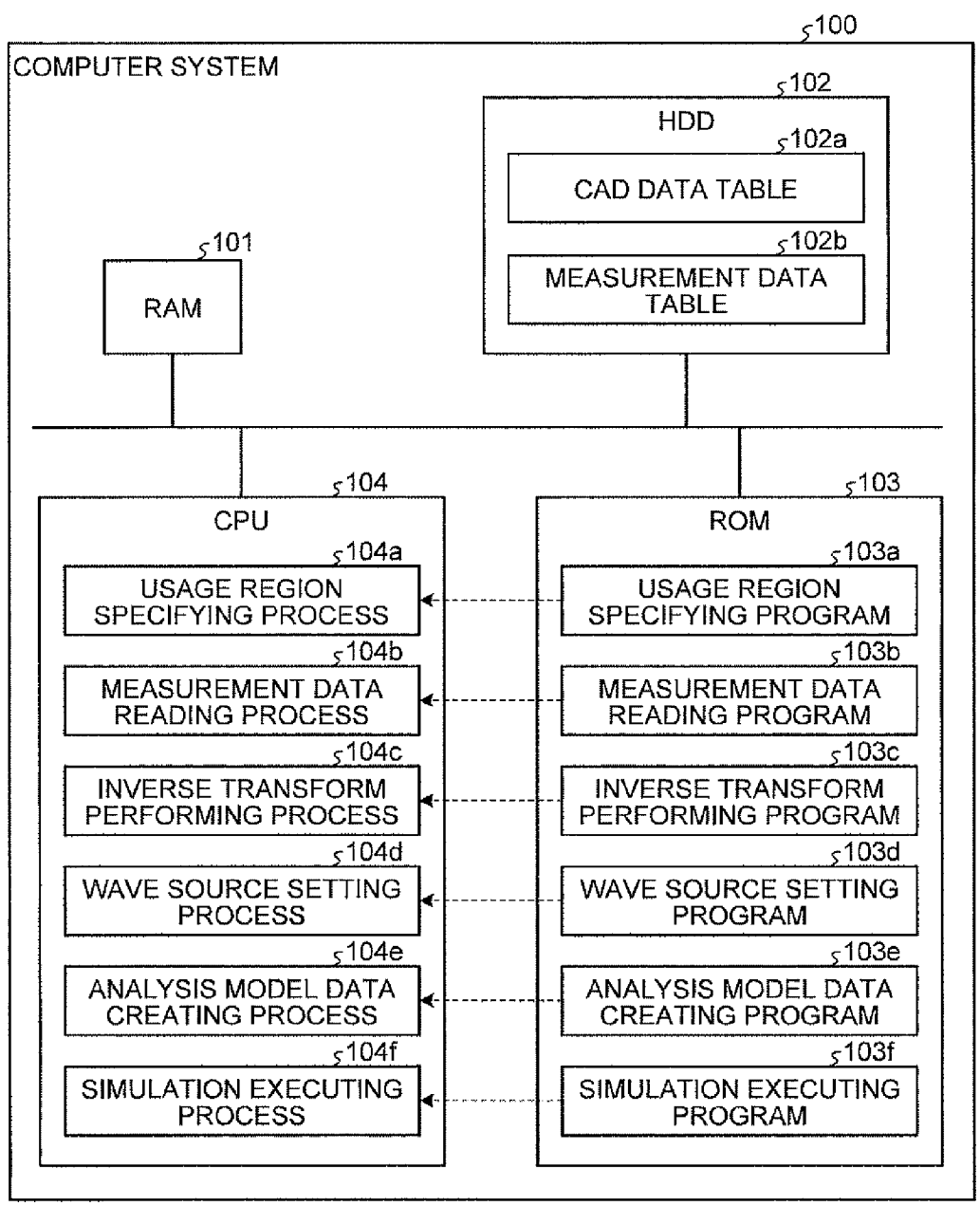
FIG. 12 is a schematic diagram of an exemplary computer system that executes an electromagnetic simulation program.
Figure 13:
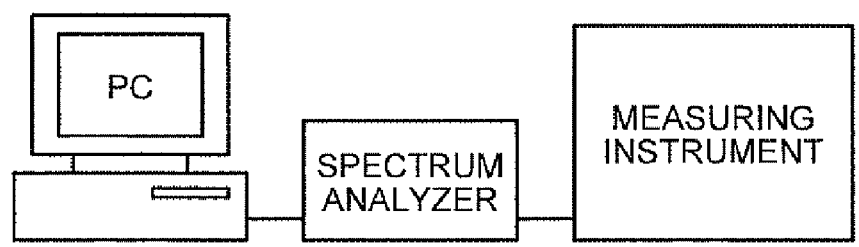
FIG. 13 is a schematic diagram of a configuration of a near-field measurement device.
Figure 14:
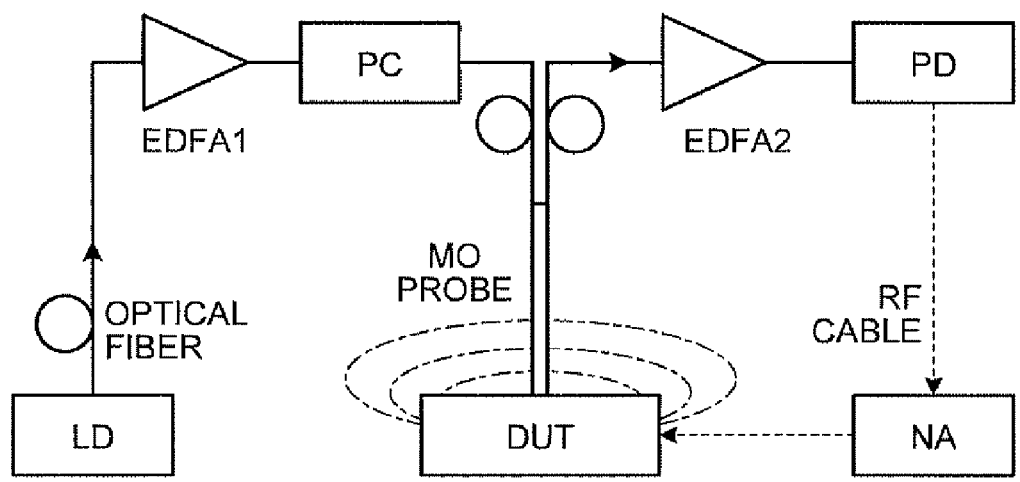
FIG. 14 is a schematic diagram of a configuration of a near-field measurement device that is able to perform amplitude and phase measurement.

FIG. 12 is a schematic diagram of an exemplary computer system that executes an electromagnetic field simulation program. As illustrated in FIG. 12, a computer system 100 includes a random access memory (RAM) 101, a hard disk drive (HDD) 102, a read only memory (ROM) 103, and a central processing unit (CPU) 104. In the ROM 103 are stored, in advance, programs having identical functions to those described in the first embodiment. That is, as illustrated in FIG. 12, in the ROM 103 are stored in advance a usage region specifying program 103a, a measurement data reading program 103b, an inverse transform performing program 103c, a wave source setting program 103d, an analysis model data creating program 103e, and a simulation executing program 103f.

The CPU 104 reads the programs 103a to 103f and executes them so that, as illustrated in FIG. 12, the programs 103a to 130f respectively function as a usage region specifying process 104a, a measurement data reading process 104b, an inverse transform performing process 104c, a wave source setting process 104d, an analysis model data creating process 104e, and a simulation executing process 104f. The usage region specifying process 104a corresponds to the usage region specifying unit 22a illustrated in FIG. 2, the measurement data reading process 104b corresponds to the measurement data reading unit 22b illustrated in FIG. 2, the inverse transform performing process 104c corresponds to the inverse transform performing unit 22c illustrated in FIG. 2, the wave source setting process 104d corresponds to the wave source setting unit 22d illustrated in FIG. 2, the analysis model data creating process 104e corresponds to the analysis model data creating unit 22e illustrated in FIG. 2, and the simulation executing process 104f corresponds to the solver 23 and the postprocessor 24 illustrated in FIG. 1.

The HDD 102 includes a CAD data table 102a that is used to store the printed circuit board CAD data generated by the user with the use of a CAD tool and a measurement data table 102b that is used to store the measurement data that is arranged in a grid-like arrangement and that includes amplitudes or phases of the magnetic and electric fields measured by a near-field measurement device.

The CAD data table 102a corresponds to the CAD data DB 21 illustrated in FIG. 2 and the measurement data table 102b corresponds to the measurement data DB 15 illustrated in FIG. 1.

Meanwhile, the programs 103a to 103f need not be stored in the ROM 103 from the start. Alternatively, for example, it is possible to store those programs in a portable physical medium such as a flexible disk (FD), a compact disk read only memory (CD-ROM), a digital versatile disk (DVD), a magnetic optical disk, or a chip card that is inserted in the computer system 100; in a fixed physical medium such as an HDD installed inside or outside of the computer system 100; or in another computer system that is connected to the computer system 100 via a public line, Internet, a local area network (LAN), or a wide area network (WAN). The computer system 100 can then read those stored programs and execute the same.

In this way, according to an aspect of the present invention, an electromagnetic field simulation apparatus enables achieving prevention in the expansion of the analysis scale of electromagnetic field simulation and thus enables achieving reduction in the computational cost of electromagnetic field simulation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An electromagnetic field simulation apparatus, comprising:
   a memory; and
   a processor coupled to the memory, wherein
   the processor executes a process comprising:
      first generating, by replacing a predetermined region in printed circuit board CAD data to be subjected to an electromagnetic field simulation with measurement data measured by a near-field measurement device, new printed circuit board CAD data;

second generating, regarding a measurement data portion in the generated new printed circuit board CAD data, analysis model data by setting, as a wave source, an electric field or a magnetic field measured by the near-field measurement device; and executing the electromagnetic field simulation with respect to the analysis model data having the wave source.

2. The electromagnetic field simulation apparatus according to claim 1, wherein the second generating includes generating the analysis model data by converting an electric field or a magnetic field measured by the near-field measurement device into a magnetic current source or an electric current source, respectively, and by setting the magnetic current source or the electric current source as a wave source.

3. The electromagnetic field simulation apparatus according to claim 1, wherein the second generating includes generating the analysis model data by converting a magnetic field measured by the near-field measurement device into a surface current and by setting the surface current as a wave source.

4. The electromagnetic field simulation apparatus according to claim 1, wherein the first generating includes generating the new printed circuit board CAD data by substituting measurement data that is measured by the near-field measurement device in such a way that a measurement position for an electric field or a measurement position for a magnetic field corresponds to a position of a Yee cell in a finite-difference time-domain (FDTD) method.

5. The electromagnetic field simulation apparatus according to claim 1, wherein, at time of executing the electromagnetic field simulation with respect to the analysis model data having the wave source set the executing includes interpolating measurement data that is arranged in a grid-like arrangement and then executing the electromagnetic field simulation.

6. A computer readable non-transitory storage medium having stored therein an electromagnetic field simulation program for an electromagnetic field simulation, the electromagnetic field simulation program causing a computer functioning as an electromagnetic field simulation apparatus to execute a process comprising:

generating, by replacing a predetermined region in printed circuit board CAD data to be subjected to an electromagnetic field simulation with measurement data measured by a near-field measurement device, new printed circuit board CAD data;

generating, regarding a measurement data portion in the generated new printed circuit board CAD data, analysis model data by setting, as a wave source, an electric field or a magnetic field measured by the near-field measurement device; and executing the electromagnetic field simulation with respect to the analysis model data having the wave source.

* * * * *